Feb. 23, 1926.  
A. L. CARROLL  
CAR WHEEL  
Filed August 5, 1925
1,574,231
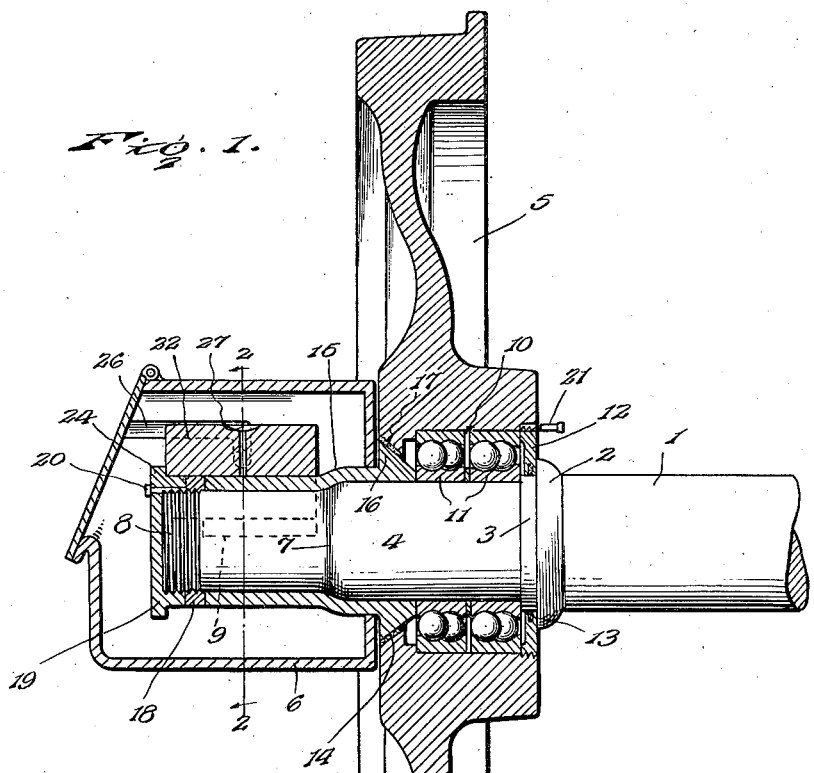
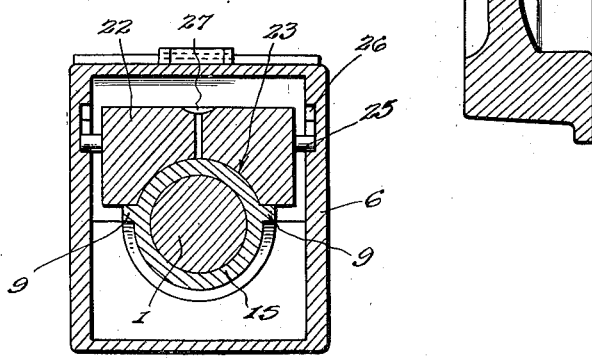
Inventor  
A. L. Carroll.
By *Lacy & Lacy*, Attorneys Patented Feb. 23, 1926.

1,574,231

UNITED STATES PATENT OFFICE.

ANDREW L. CARROLL, OF ST. LOUIS, MISSOURI, ASSIGNOR OF ONE-THIRD TO FRED D. JOHNSON, OF ST. LOUIS, MISSOURI.

CAR WHEEL.

Application filed August 5, 1925. Serial No. 48,346.

*To all whom it may concern:*

Be it known that I, ANDREW L. CARROLL, a citizen of the United States, residing in the city of St. Louis and State of Missouri, have invented certain new and useful Improvements in Car Wheels, of which the following is a specification.

This invention relates to car wheels and has for its object the provision of a novel construction whereby the car wheel will rotate freely upon the axle and will be effectually restrained against movement longitudinally of the axle. Another object of the invention is to provide a novel construction whereby the journal end of the axle will be strengthened and rotation of the axle in the journal box will be prevented. The invention is illustrated in the accompanying drawing and will be hereinafter fully set forth.

In the drawing:

Figure 1 is a vertical section of a car wheel embodying my present improvements, the axle being shown in elevation;

Fig. 2 is a detail section on the line 2—2 of Fig. 1.

In carrying out my present invention, I provide upon the axle 1 a shoulder or abutment 2 which extends annularly of the axle and may be formed in any manner which will produce the desired rigidity. The shoulder may be formed by cutting down the circumferential surface of the axle or it may be a collar shrunk, welded or otherwise permanently united with the axle. Extending from the outer face of the shoulder 2 is a second smaller annular shoulder 3 and at the outer side of said shoulder the axle is reduced to define a portion 4 about which the car wheel 5 may rotate. The portion 4 of the axle extends through the inner side of the journal box 6 and the end of the axle within the journal box is further reduced and is connected with the portion 4 by a tapered shoulder 7, the extremity of the axle being threaded, as shown at 8. The car wheel 5 is formed centrally with a chamber 10 in which are mounted anti-friction bearings 11 of any approved form, and in the inner side of the central portion of the car wheel is fitted a cap plate 12 which abuts at its outer side the shoulder 2 and has its central portion encircling the shoulder 3 and equipped with a felt washer 13 bearing on said shoulder so as to prevent loss of lubricant placed within the chamber 10. The outer race rings of the bearings 11 may bear against the cap plate 12 while the inner race rings of the innermost bearings abut the shoulder 3, as clearly shown. The outer race ring of the outer bearings abuts the outer wall of the said chamber 10 and the central opening through the wheel leads outwardly from the said chamber and has its extremity flared, as shown at 14. Fitted closely about the end portion of the axle is a sleeve 15 which has its inner end extended through the opening in the outer side of the car wheel so that it may abut the inner race ring of the outer anti-friction bearing 11, as shown clearly in Fig. 1. Extending around sleeve 15 adjacent the inner end thereof is a flange or rib 16 which has its inner side beveled so as to conform to the flared end of the opening through the car wheel, and a felt pad, indicated at 17, may be secured upon this flared face of the flange 16 so as to prevent loss of lubricant. The sleeve 15 fits tight about the end portion of the axle and after the sleeve has been assembled with the axle a nut or collar 18 is engaged upon the threaded extremity 8 of the axle and turned home against the end of the sleeve. A cap 19 is then fitted upon the end of the axle to bear against the outer side of the nut or collar 18 so that the said cap serves as a lock nut to hold the nut 18 and the sleeve 15 permanently in place and against rotation on the axle. To further guard against loosening and loss of the parts, a lock pin 20 may be engaged through the end of the cap 19 to be received in mating grooves formed in the opposed surfaces of the axle and the rim portion of the cap. A similar pin 21 may be employed to prevent loosening of the cap 12 in the inner side of the car wheel, and the pin 20 may be inserted diametrically through the rim of the cap and the end of the journal.

Within the journal box 6 a block 22 is provided, and this block has its under side grooved or formed with a concave seat 23 to rest upon the collar 15 and extend over the nut 18 to bear against the flange 24 on the cap 19. The under side of this block 22 rests upon the ribs formed longitudially on the sleeve 15 and thereby prevents rotation of the sleeve and the axle, it being noted that the retaining block is provided with studs or lugs 25 upon its sides which will, by engaging the side walls of the journal box, prevent twisting of the block therein. To facilitate the placing of the block in position, the side walls of the journal box are formed with grooves 26 which facilitate the entrance of the lugs or studs 25 therein. The block is also provided centrally with an oil duct or cup 27 whereby lubricant may be supplied to the exterior of the sleeve 15 so that wear between the opposed faces of the block and the sleeve due to possible lateral movement of the sleeve will be minimized.

It will be noted that the cap 12 secured in the inner side of the car wheel body is flush with the adjacent surface of the car wheel and when the parts are properly assembled the outer surface of the flange 16 will be flush with the outer surface of the car wheel. The car wheel may rotate freely about the axle while the axle will be held against rotation. The journal box 6 is, of course, secured rigidly upon the truck (not shown) and the load is carried by the journals or axle ends. The inner race rings are fixed to the axle so that there is no relative movement between the rings and the axle, and, when the collar 18 and lock nut 19 are turned home, the sleeve 15 and the inner race rings will be clamped by and between the collar and lock nut at one end and the shoulder 3 at the opposite end. The sleeve will be clamped to the axle and the lock nut is pinned to the axle so that it is positively held against relative rotation. The wheel is free of the axle and no rotatable part is in contact with the axle so that no rotation will be imparted thereto. The flange 16 and the shoulders 2 and 3 of the axle will effectually prevent lateral movement of the car wheel so that the wheel will run freely and will be true through a long period of use. In rounding curves, the thrust of the lower race rings will be received by the inner end of the sleeve 15 while the thrust of the outer race rings will be carried by the cap 12 and the shoulder 2, the lateral movement of the wheel being in this way very effectually counteracted so that the resistance to the travel of the wheel upon the track rails will be minimized. The construction is very simple and relieves the wheel of all projections which might cause damage through contact with some extraneous object and the relative rotation of the axle and the sleeve 15 is positively prevented while at the same time sufficient lateral or endwise play of the axle is permitted to avoid jamming of any of the parts by reason of vibration incident to travel over rough rails or poor rail joints.

Having thus described the invention, I claim:

1. A car wheel structure comprising a wheel body having a central chamber larger at the inner side of the wheel than at the outer side thereof, anti-friction bearings fitted in said chamber and abutting at one side the outer wall of said chamber, a cap plate secured in the inner side of the car wheel body to close the inner end of said chamber and abut the said bearings, and axle provided with annular shoulders abutting the inner sides of the bearings and the said cap respectively, and an annular shoulder circumscribing the axle at the outer side of the car wheel and fitting within the end of the opening through the car wheel.

2. A car wheel structure comprising a car wheel body having a central opening therethrough, an axle extending through said opening, shoulders on the axle at the inner side of the car wheel, a sleeve fitted upon the outer portion of the axle and having an annular shoulder fitting within the outer end of the opening through the car wheel body, anti-friction bearings fitted within the opening in the body and abutting the inner end of said sleeve and also abutting the shoulders on the axle, longitudinal ribs on the opposite sides of the said sleeve, a lock nut fitted upon the outer end of the axle at the outer end of said sleeve, and a block bearing upon the sleeve and the lock nut and having its under side resting upon the ribs upon the sleeve whereby to prevent rotation of the sleeve and the axle.

In testimony whereof I affix my signature.

ANDREW L. CARROLL. [L. S.]